United States Patent [19]

Avramova et al.

[11] Patent Number: 4,915,885

[45] Date of Patent: Apr. 10, 1990

[54] PROCESS OF MAKING A BLEND OF PET AND PBT

[75] Inventors: Nadka V. Avramova; Isak A. Avramov; Stoyko C. Fakirov, all of Sofia, Bulgaria; Jerold M. Schultz, Newark, Del.

[73] Assignee: University of Delaware, Newark, Del.

[21] Appl. No.: 210,261

[22] Filed: Jun. 23, 1988

[30] Foreign Application Priority Data

Jul. 23, 1987 [BG] Bulgaria ................................. 80693

[51] Int. Cl.$^4$ ...................... B29C 35/16; B29C 55/04; B29C 71/02
[52] U.S. Cl. .................................. 264/28; 264/210.5; 264/235.6; 264/178 R; 525/444; 528/481
[58] Field of Search ................ 264/28, 85, 101, 210.5, 264/235.6, 289.3, 178 R; 428/212, 480; 525/444; 528/481

[56] References Cited

U.S. PATENT DOCUMENTS

| | | | |
|---|---|---|---|
| 3,803,275 | 4/1974 | Corsover | 264/28 |
| 3,953,394 | 4/1976 | Fox et al. | 524/444 X |
| 4,286,011 | 8/1981 | Wong | 428/212 X |
| 4,351,758 | 9/1982 | Lu et al. | 525/444 X |
| 4,593,077 | 6/1986 | Borman et al. | 525/444 |
| 4,755,336 | 7/1988 | Deeg et al. | 264/210.5 X |
| 4,788,017 | 11/1988 | Schlomer et al. | 264/28 |

OTHER PUBLICATIONS

Ciferri and Ward "Ultra-High Modulus Polymers", Applied Science Publishers (1977), pp. 227-231.
Slusallek et al., Kolloid ZZ Polymers 251 (1973), pp. 865-870.
Slusallek et al., Angew. Makromol Chem. 53 (1976), pp. 35-51.

*Primary Examiner*—Jeffery Thurlow
*Assistant Examiner*—Leo B. Tentoni
*Attorney, Agent, or Firm*—James H. Ryan

[57] ABSTRACT

A process of preparing a homogeneous amorphous polymeric blend of polyethyleneterephthalate (PET) and polybutyleneterephthalate (PBT) which includes intimately mixing the PET and PBT at a weight ratio of about 10:90–90:10, melting the mixture at 290°–330° C., cooling the mixture to 0°−−194° C. by extruding it onto rollers maintained in a cooling bath and orienting the polymer of the resulting continuous shaped object at room temperature to a draw ratio of about 5:1, with subsequent annealing at about 120°–180° C. for about one hour.

5 Claims, No Drawings

4,915,885

PROCESS OF MAKING A BLEND OF PET AND PBT

RIGHTS OF THE U.S. GOVERNMENT

The government of the United States of America has certain rights to this invention pursuant to National Science Foundation Grant No. INT 8520639.

PRIORITY

Priority is claimed of Bulgarian Authorship Certificate (Patent) Application filed under Ser. No. 80693 for "High-Modulus Thermoplastic Polymer Material" on July 23, 1987, in Sofia, Bulgaria.

BACKGROUND OF THE INVENTION

1. Field of the invention

The invention relates to blends of high modulus thermoplastic polymer material based on commercial polyethyleneterephthalate (PET) and polybutyleneterephthalate (PBT) useful for preparing various shaped objects such as film, sheets, and the like.

2. Prior Art

It is known that orientation of polymers improves substantially their mechanical properties (Ultra-High Modulus Polymers, Leningrad, Chimija (1983) (in Russian); identical to Ciferri and Ward, Ultra-High Modulus Polymers Applied Science Publishers (1977), 227–231. Two-stage drawing of PET, the first stage at room temperature and the second one after annealing at a temperature close to the melting point, results in a high degree of orientation (15–20:1) and leads to an improvement of the mechanical strength of the polymer (K. Slusallek, H. C. Zachmann, Kolloid Z. Z. Polymere, 251 (1973) 865; Angew. Makromol. Chem., 53 (1976) 35). Increase in the degree of orientation can also be achieved by increasing the molecular weight of polycondensation polymers through additional solid state polycondensation (Slusallek et al., loc. cit.; S. Fakirov et al., IUPAC Intern. Symp. on Macromol., Aberdeen (1974), Abstr. Book p. 85). The disadvantages of the known materials are due to the fact that their moduli are not sufficiently high and their achievement requires high energy consumption.

DESCRIPTION OF THE INVENTION

The object of this invention is to provide a high modulus thermoplastic polymer material based on commercial PET and PBT with higher elasticity modulus and tensile strength than those properties of known materials.

The material produced is a homogeneous mixture or blend of commercial PET and PBT in a ratio between 10:90 and 90:10 parts by weight, characterized by an amorphous structure. The latter results from the melting of the mixture at a temperature of 290°–330° C. and rapid quenching of the melt in a bath with a temperature between 0° and −194° C.

Pure amorphous PBT crystallizes quite rapidly at room temperature due to its low glass transition temperature. Pure amorphous PET crystallizes quite slowly at room temperature but is brittle and cannot be oriented (drawn). The material according to the invention represents a mixture of both polymers in the amorphous state and practically preserves this state but is capable of being oriented at room temperature to a draw ratio of 5:1.

Subsequent crystallization of the already oriented material is achieved by isothermal treatment with free, or preferably with fixed ends, at a temperature in the range of 120°–180° C. (preferably 170° C.) in inert atmosphere or vacuum for 30 to 180 minutes (preferably 60 minutes). Annealing at the lower limit of the above mentioned temperature range can also be carried out in air.

The advantages of the blend of this invention are due to the fact that it preserves its amorphous state at room temperature and for this reason can be oriented to a draw ratio amounting to 5:1 at room temperature. After an additional isothermal treatment this material, based on commercial PBT and PET, has a tensile strength that is 3–4 times higher and an elasticity modulus that is 2–4.7 times higher than that of pure commercial PET and PBT separately. Furthermore, its preparation requires less energy consumption.

EXAMPLE

Commercial PET and PBT (pellets or powder) are mixed in a ratio of 40:60, 50:50, or 60:40 parts by weight with subsequent melting at 310°–320° C. to form a homogeneous blend. The melt is extruded through a die with a flow rate of 15–20 g/min onto metal rolls rotating at 0.5–2 Hz immersed in a cooling bath having a temperature between 0° and −194° C. A continuous film is obtained, its thickness depending on the distance between the rolls (0.015–0.15 mm). Strips (5–8 cm long) of this film are oriented at room temperature to a draw ratio of 5×. The oriented samples are isothermally annealed in an inert atmosphere (including vacuum) at 170° C. for 60 minutes. The results from the physicomechanical tests of the present novel material as well as those for commercial PBT and PET are presented in the following table.

TABLE

| Parameter | PET + PBT Blends (according to the invention) | PBT (Hoechst, FRG) | PET (Hoechst, FRG) |
|---|---|---|---|
| I. NONORIENTED | | | |
| 1. Elasticity modulus (MPa) | 800–1000 | 970 | 1100 |
| 2. Tensile strength (MPa) | 140–160 | 40 | 55 |
| 3. Relative elongation at break (%) | 400 | 400–430 | 280–320 |
| II. ORIENTED | | | |
| 1. Elasticity modulus (MPa) | 3000–3500 | | |
| 2. Tensile strength (MPa) | 150–165 | | |
| 3. Relative elongation at break (%) | 20–80 | | |
| III. ORIENTED AND THEN ANNEALED | | | |
| 1. Elasticity modulus (MPa) | 4000–5540 | 1160 | 2300 |
| 2. Tensile strength (MPa) | 220–248 | 250–260 | 220 |
| 3. Relative elongation at break (%) | 15–20 | 30 | 40 |

Having described our invention, we claim:

1. The process of preparing a homogeneous amorphous polymeric blend of polyethyleneterephthalate (PET) and polybutyleneterephthalate (PBT) which comprises:
   (a) intimately mixing the PET and PBT at a weight ratio of about 10:90–90:10;

(b) melting the mixture at a temperature of about 290°–330° C.; and
(c) cooling the mixture at a temperature between about 0° C. and −194° C.

2. The process of claim 1 wherein the polymeric blend is formed into a shaped object during the cooling step (c).

3. The process of claim 2 wherein the cooling step (c) is carried out by extruding molten mixture from step (b) onto rollers maintained in a cooling bath and thereby forming a continuous shaped object from the polymeric blend.

4. The process of claim 3 including the additional step (d) of orienting the polymer of the continuous shaped object to a draw ratio of about 5:1.

5. The process of claim 4 including the additional step (e) of annealing the continuous shaped object from step (d) at a temperature of about 170° C. in an inert atmosphere.

* * * * *